United States Patent [19]

Nicholson

[11] Patent Number: 4,632,777
[45] Date of Patent: Dec. 30, 1986

[54] CATHODIC PROTECTION COATING COMPOSITION

[76] Inventor: John P. Nicholson, R.R. #5, Orangeville, Ontario, Canada, L9W 2Z2

[21] Appl. No.: 583,059
[22] Filed: Feb. 23, 1984
[51] Int. Cl.⁴ .............................................. H01B 1/06
[52] U.S. Cl. ................................................... 252/511
[58] Field of Search ..................... 252/511; 204/181 C

[56] References Cited

U.S. PATENT DOCUMENTS 4,035,265  7/1977  Saunders ............................. 252/511

Primary Examiner—Josephine L. Barr
Attorney, Agent, or Firm—Burgess, Ryan & Wayne

[57] ABSTRACT

The present invention relates to a cathodic protection system for reinforced concrete structures, having reinforced steel embedded in the concrete mix. The system includes an electrically conductive coating composition applied in fluid form over an outer surface of the concrete mix. The coating composition, when dry, comprises a permeable binder material through which moisture permeates preventing entrapment of moisture in the reinforced concrete structure. The composition further includes a predetermined amount of electrically conductive filler material uniformly distributed in the binder material whereby the coating composition has a predetermined value of resitivity. The coating composition protects the reinforced concrete structure from corrosion when electrical energy flows through the coating composition. The system further includes a source of DC electrical energy connective between the reinforcing steel and the electrically conducted coating composition such that the electrically conductive coating composition is anodic with respect to the reinforcing steel.

14 Claims, 6 Drawing Figures

CATHODIC PROTECTION COATING COMPOSITION

The present invention relates to a cathodic protection system for reinforced concrete structures including a novel coating composition applied over an outer surface of the reinforced concrete structure.

Several attempts have been made to retard corrosion of reinforcing steel in reinforced concrete structures, particularly for reinforced concrete structures located within a few miles of an ocean or in areas where de-icing salts are used through winter months. Salts coming into contact with the reinforced concrete structure contaminate the concrete by creating chloride ions in the concrete. The chloride ions enhance the corrosion of the reinforcing steel which exerts pressure on the concrete and results in spalling and cracking.

Several attempts have been made in the past to arrest or retard the corrosion of the reinforced concrete structure. One method involved the modification of the concrete by the introduction of latex or polymeric modifiers into the concrete mix. While the introduction of the latex or polymeric modifiers has retarded corrosion, it has not effectively arrested corrosion.

Another recent attempt has involved cathodic protection of the reinforced concrete structure. One method of cathodic protection has been to implant anodic connectors in asphaltic materials which connectors are applied to the reinforced concrete. The anodic terminals are connected to a source of DC energy which stops or reverses the flow of current in the reinforced concrete structure.. The asphaltic coating may include some carbon material. To protect the reinforced concrete 2 to 4 inches of asphaltic material is applied over the concrete. The problem or disadvantage with the use of asphaltic material is that is adds considerable weight to the reinforced concrete structure and is subject to degradation from freeze-thaw cycles. Also, it is extremely difficult, if not impossible, to apply the asphaltic coating to vertical and soffit surfaces of the structure. The cost of installation is expensive.

A second method of cathodic protection of reinforced concrete structures involves cutting numerous slots into the deck and embedding platinum-clad niobium, titanium or tantalum anode wires in carbon filled grout, the grout being placed in the slots. Again a current is supplied by a source of DC power to stop or reverse the flow of current from the anodic to cathodic areas and arrest corrosion of the reinforced concrete structure.

With respect to these two methods of cathodic protection, they can be readily applied to horizontal surfaces of reinforced concrete structures but they may not practically be installed on vertical surfaces or soffit sides of the reinforced concrete structures. The cost of installation is expensive.

While it is known to apply protective coatings over the surfaces of metal structures such as cars, hulls of ships and the like so as to protect these structures from corroding, these methods usually involve applying a first electrically non-conductive or semi-conductive coating to the metal surface to be protected and then a second over-coating of an electrically conductive coating. Prior to the application of the two coatings, the surface is usually pretreated. These types of cathodic protection systems have been disclosed in U.S. Pat. No. 3,868,313 issued Feb. 25, 1975 to Gay and U.S. Pat. No. 3,151,050 issued Sept. 29, 1964 to Wilburn. Both these patents teach the pretreatment of a metal followed by the application of an electrically nonconductive or semi-conductive coating applied to the metal to be protected and an overcoating of an electrically conductive coating. Gay teaches that the conductive coating would comprise up to 50% by weight elemental carbon in a paint base comprising one of epoxy resin, chlorinated rubber, natural rubber, synthetic rubber or polyvinyl chloride.

These systems of cathodic protection disclosed in the above-identified U.S. Patents, however, are not practical for use in protecting reinforced concrete structures. It is not practical to cover the concrete with an electrically non-conductive or semi-conductive coating before applying an electrically conductive coating because conduction of an electrical current through the concrete mix will be greatly inhibited if not negated. As a result, it would be considerably expensive in terms of power costs to energize the system. Furthermore, these patents do not teach coating a concrete mix surface, but rather teach coating the metal surface. Prior to coating the metal surface, the patents teach pretreating the metal surface either by sandblasting, grid-blasting or by other mechanical means. This teaching is not applicable to metallic reinforcing steel of reinforced concrete structures because to pretreat the metal surface of the reinforcing steel to be coated, the concrete must be removed from the reinforcing steel. This method cannot find application in existing reinforced concrete structures. Lastly, none of these patents take into consideration that the concrete of the reinforced concrete structure absorbs and discharges moisture depending on the temperature and humidity conditions of the environment. As a result, the coating compositions disclosed in these patents if applied to the concrete surface would cause water entrapment at localized points in the concrete structure which will result in the coating compositions separating or blistering away from the concrete surface. Any voids left by the separation of the coating from the concrete surface are highly susceptible to corrosive forces.

It is therefore an object of the present invention to provide a cathodic protection system for use in reinforced concrete structures which may be readily installed and applied to all surfaces of the reinforced concrete structure.

It is another object of the present invention to provide a cathodic protection system which includes a coating composition overlying the outer surface of the reinforced concrete structure and which does not blister or separate from said surface due to moisture entrapment.

It is another object of the present invention to provide a cathodic protection system which does not require surface pretreatment of the concrete structure prior to application of the coating.

In accordance with one aspect of the present invention there is provided a cathodic protection system for reinforced concrete structures having reinforcing steel embedded in the concrete mix. The system includes an electrically conductive coating composition applied in fluid form over an outer surface of the concrete mix. The coating composition, when dry, comprises a permeable binder material through which moisture permeates preventing entrapment of moisture in the reinforced concrete structure. The coating composition further includes a predetermined amount of electrically conductive filler material uniformly distributed in a binder material whereby the coating composition has a predetermined value of resistivity. The coating composition protects the reinforced concrete structure from corrosion when electrical energy flows through the coating composition. The system further includes a source of DC electrical energy which is connected between the reinforcing steel and the electrically conductive coating composition such that the electrically conductive coating composition is anodic with respect to the reinforcing steel.

The system may further include decorative permeable coating applied over the conductive coating composition such as, for example, an acrylic paint. The conductive coating may be applied directly to the outer surface of the concrete without requiring pretreatment of the concrete structure. The conductive coating composition may be applied in a thickness from between 5 to 50 mils. The system may further include anodic connecting means which are installed on the surface of the concrete and coated with the conductive coating composition. The anodic connecting means are connected to the positive terminal of the source of DC electrical energy. The negative terminal of the source of DC electrical energy is connected to the reinforcing steel.

The above cathodic protection system finds advantage in that it is the outer surface of a concrete structure that is being coated and not the reinforcing steel, per se, making the application of the coating practical to existing structures. Further, the coating composition may be brushed on or rolled on, or spray applied in one pass depending on the solids content of the coating composition, to vertical and soffit surfaces of the reinforcing structure in addition to horizontal surfaces. As a result, the coating composition can completely surround all exposed surfaces of the reinforced concrete structure. The coating composition adds little weight to the structure when compared with the prior art methods of using asphaltic material.

In accordance with another aspect of the present invention, there is provided an electrically conductive coating composition suitable for covering an outer concrete surface of a reinforced concrete structure, and protecting the reinforced concrete structure from corrosion when electrical energy flows through the coating composition. The coating composition comprises a permeable binder material through which moisture permeates preventing entrapment of moisture in the reinforced concrete structure. The coating composition further includes a predetermined amount of electrically conductive filler present in said binder material such that the coating composition has a predetermined value of resistivity.

The binder material of the present invention provides for good adherence of the coating to the concrete structure and allows for uniform dispersion of the electrically conductive filler throughout the binder. The binder is permeable to allow moisture to pass therethrough such that the concrete may absorb and discharge moisture depending on changes in humidity and weather conditions. Any suitable resin may be used as a binder and in particular, acrylic resins may be used. An acrylic emulsion polymer or an acrylic latex paint may be used for the binder. The acrylic latex may be selected from one of methyl methacrylate, butyl methacrylate, methyl acrylate and 2-ethyl hexylacrylate and acrylates which contain similar carbon moieties in the ester (OR) portion of the molecule. The acrylic latex may also comprise one of the styrene and acrylonitrile monomer polymerized with acrylic monomers.

The electrically conductive coating material may comprise any suitable conductive filler and preferrably, comprises a combination of graphite filler and elemental carbon filler. The elemental carbon filler may be selected from one of petroleum coke, metallurgical coke, calcined petroleum coke, and fluid petroleum coke. The graphite filler may be selected from one of the group consisting of acetylene black graphite, natural graphite and flake graphite.

When dry, it is envisaged that the coating composition may comprise from 5% by weight to 40% by weight of the permeable binder material and from 50% by weight to 95% by weight of the electrically conductive filler. This is believed to result in the dried coating composition having a resistivity in the range of 2 ohms per square per mil thickness to 100 ohms per square per mil thickness (per square = per square measuring foot by one foot).

It is envisaged that the elemental carbon filler comprises from 50% by weight to 85% by weight of the total composition when dry and the graphite filler comprises 5% by weight to 45% by weight of the total composition when dry.

The preferred composition comprises about 46% carbon filler, 17% graphite filler and 18% acrylic binder.

In the preferred construction a surfactant is added in about 1%. The purpose of the surfactant is to enhance the wettability of the coating composition when it is applied to concrete. The coating composition is based in a suitable solvent such as for example, a water solvent which comprises about 15% by weight of the total composition. The water solvent evaporated from the coating composition as it dries after application to the outer surface of the concrete structure.

By applying this coating composition in thicknesses of 5 to 50 mils to the outer wall of the reinforced concrete structure and applying 0.5 to 30 milliamps per square foot of direct current through the dried coating composition, the corrosion of the reinforcing steel in the concrete structure has been arrested.

The coating composition is formulated from a mixture of two manufactured products. The first product is referred to in the trade as "Loresco" type DW1, sold by Cathodic Engineering Company, Inc., of Hattiesburg, Miss., U.S.A. This composition is mixed with a coating referred to in the trade as "Electrodag 112", manufactured by Acheson Colloids Co., of Port Huron, Mich. Electrodag 112 contains acrylic binder and 34% by weight solids content comprising natural flake graphite. Electrodag 112 is a water-based solvent and comprises approximately 36% by weight binder and 30% by weight water solvent. The Loresco type DW1 backfill comprises 91.77% elemental carbon by weight and is a solid composition. When these two compositions are mixed the graphite and the carbon are uniformly dispersed through the binder.

EXAMPLE 1

Equal amounts of Electrodag 112 and Loresco type DW1 were mixed together and about 1% of the total weight of this mixture of a surfactant was added to provide a solution comprising the approximate following weight by percents.

| | |
|---|---|
| Elemental carbon | 45.5% |
| Graphite | 16.8% |
| Binder | 17.8% |
| Surfactant | 1.0% |
| Solvent | 14.9% |

This coating composition, when applied to a reinforced concrete structure in a thickness of 10 mils, had a resistivity of 20 ohms per square per mil thickness and corrosion is arrested when a current of 0.5 to 30 milliamps is applied through the coating. This coating composition comprises a total carbon content of 62.3% and 78% when dry.

EXAMPLE 2

A mixture of 2 parts Loresco type DW1 and 1 part Electrodag 112 can be mixed together and 2% by weight surfactant based on the mixture can then be added. This composition would have the following approximate weight percents:

| | |
|---|---|
| Elemental carbon | 60.2% |
| Graphite | 11.1% |
| Binder | 11.8% |
| Surfactant | 2.0% |
| Solvent | 9.8% |

In this instance, the total amount of electrical conductive filler would be increased to 73.3% weight percent of the composition or 86% of the composition when dry and the binder weight percent would be reduced to 11.8% of the composition or 14.2% of the composition when dry. This is believed to result in the dry composition having a resistivity in the order of 15 ohms per square per mil thickness and corrosion should be arrested when a current of 0.5 milliamps is applied through the coating.

EXAMPLE 3

A coating composition may be developed by mixing ½ part Loresco type DW1 and 1 part Electrodag 112 and adding a 1% by weight of surfactant to the total composition. This coating composition will have the following approximate weight percents:

| | |
|---|---|
| Elemental carbon | 30.3% |
| Graphite | 22.5% |
| Binder | 23.8% |
| Surfactant | 1.0% |
| Solvent | 19.8% |

This coating composition will result in a total carbon content of 52.8 weight percent of the composition and 71% of the composition when dry and 23.8% of binder and 32% of binder in the composition when dry. This coating composition when dry should have a resistivity in the order of 30 ohms per square at 5 mil thickness and should arrest corrosion when 3 milliamps of current per square foot is applied to the coating when dry.

BRIEF DESCRIPTION OF THE DRAWINGS

For a better understanding of the nature and operation of the present invention, reference may be had by way of example to the accompanying diagrammatic drawings in which:

Referring now to FIG. 1 there is shown a reinforced concrete structure 10. The reinforced concrete structure 10 comprises reinforced support concrete columns 12, concrete beams 14 and upper deck portion 16 provided with guard rails 18. It should be understood that the reinforced concrete structure may comprise a bridge, elevated roadway, parking garage, water tank, silo, wharf, or any other suitable structure.

Figure 1:
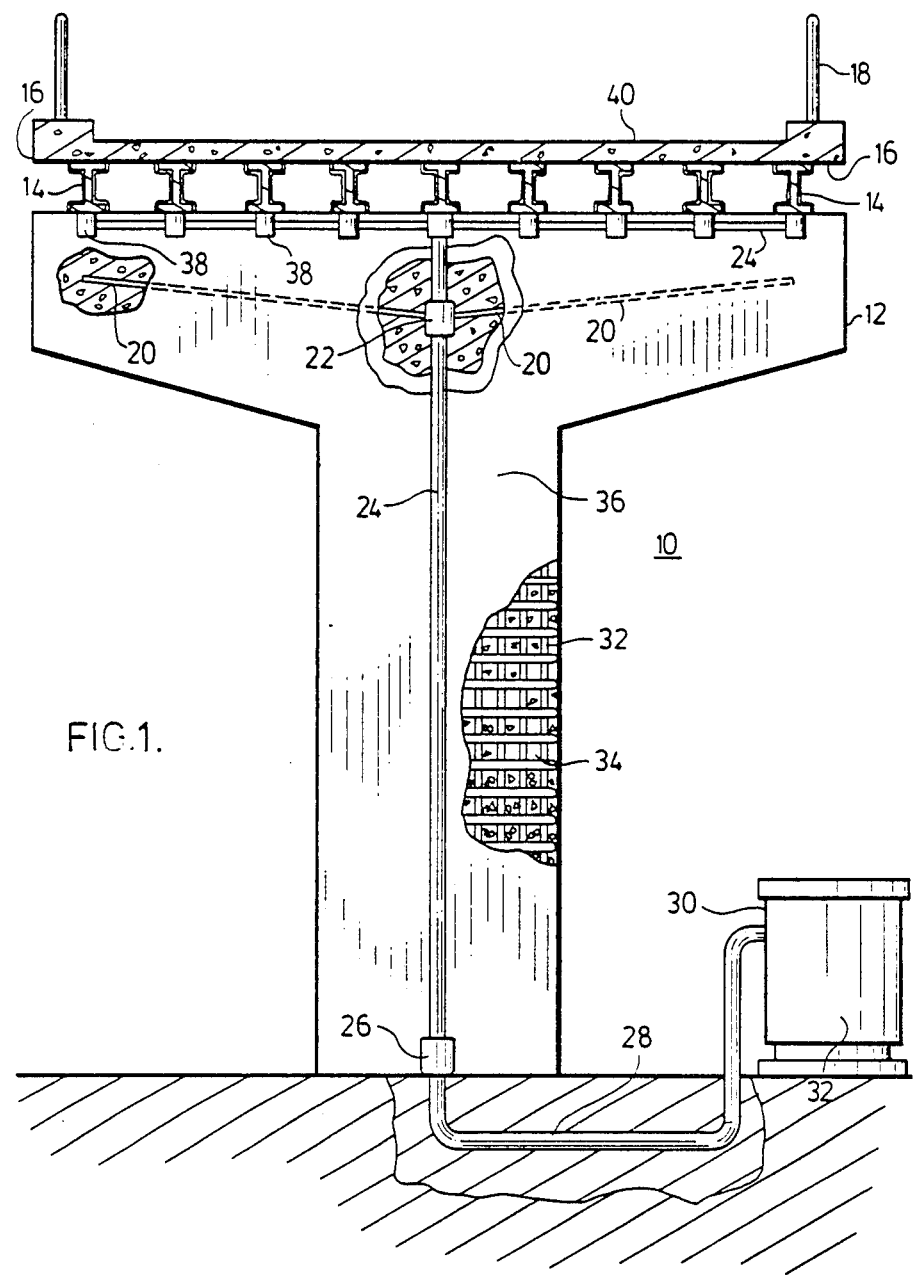
FIG. 1 is an elevational view of a reinforced concrete structure to which the cathodic protection system of the present invention has been applied.

Anodic connecting means, strips or wires 20 are shown extending from a junction box 22 across the column. Electrical connection of the wires 20 is provided by means of conductors passing through conduit 24 from junction box 26. Junction box 26 is connected through appropriate conduit 28 to a rectifier 30 maintained in a concrete platform 32. It should be understood that the rectifier may be attached to the column 12 or other structure if desired. The rectifier applies an appropriate voltage to the coating composition to render it conductive relative to the reinforced concrete structure and arrest corrosion.

The column 12 comprises reinforcing steel 32 tied together by means of tie wire 34. The reinforcing steel is surrounded by concrete 36. The anodic wires 20 run across the outer surface of the reinforced concrete aperture 12 and are overcoated with the conductive coating of the present invention. Additional junction boxes are provided at 38 so as to allow the anodic wire such as wire 20, to pass beneath each of the concrete beams 14. The entire reinforcing concrete structure 10 is coated with the coating composition of the present invention as described hereinbefore. The upper deck portion 40 may be overlayed with an asphaltic wear course. The arrangement of the anodic wires and the thickness of the coating applied will be dependent upon the structure to be protected.

Figure 2:
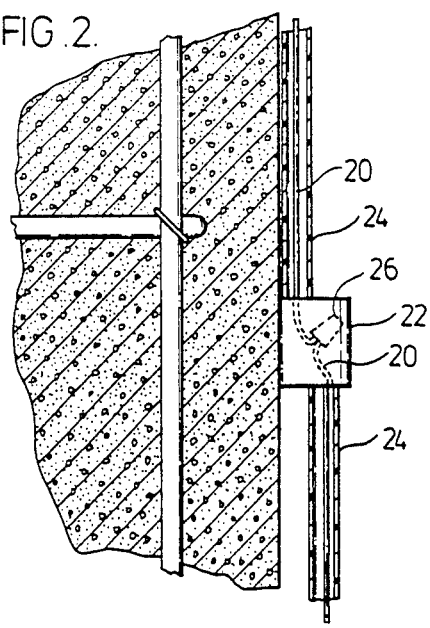
FIG. 2 is an enlarged sectional view showing anodic connecting means or strips adhesively bonding to the concrete structure.

Referring now to FIG. 2, there is shown a manner in which the anodic wire 20 can be interconnected to the junction box and run through the conduit 24 by means of a cap-type interconnector 26.

Figure 3:
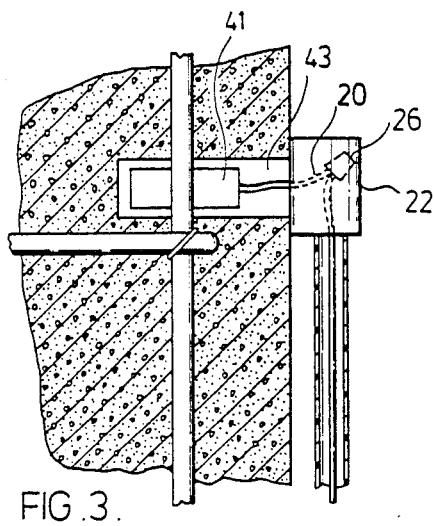
FIG. 3 is an enlarged sectional view showing the connection of the negative cable to the reinforcing steel.

In FIG. 3, a reference electrode 42 is installed to control the output of the rectifier.

Figure 4:
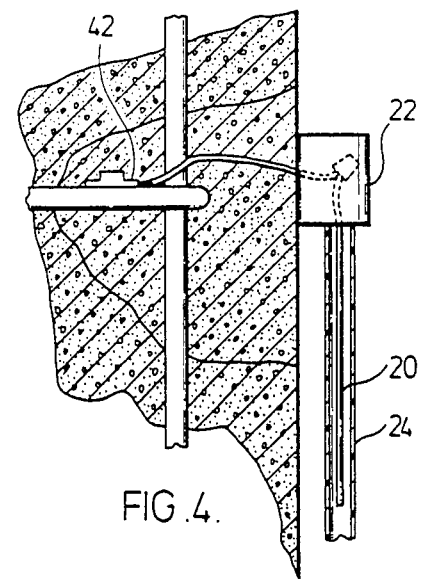
FIG. 4 is an enlarged sectional view showing an alternate connection of the negative cable to the reinforcing steel.

Referring to FIG. 4, the reinforcing steel is connected to the negative wire 24 of the rectifier by means of a junction at junction box 22. In FIG. 4 the electrical connection is made by a thermite welding process. The electrical wire is run through the surface of the concrete and the cavity is filled with a cementitious grout 43.

Figure 5:
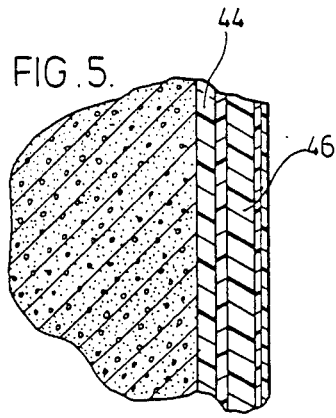
FIG. 5 is a sectional view showing the anodic connecting means of strip adhesively connected to the structure and overlayed with the conductive coating of the present invention.

Referring to FIG. 5 there is shown a coating 44 of the present invention overlaying the concrete structure 10 and a decorative top coating 46 provided thereover.

Figure 6:
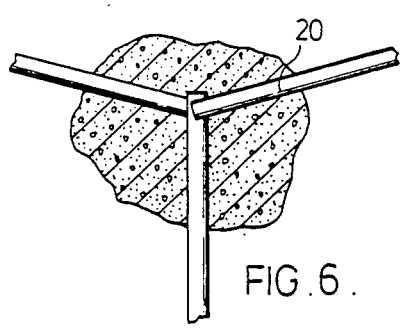
FIG. 6 is a sectional view showing the interconnection of one or more anodic connecting means without the use of a junction box.

Referring to FIG. 6 there is shown an interconnection of the anodic wire 20 such that a junction box is not used. This is an alternate design and contact between the wires is maintained by placing the coating composition over the wires.

The embodiments of the invention in which an exclusive property or privilege is claimed are defined as follows:

1. A cathodic protection system for reinforced concrete structures having reinforcing steel embedded in concrete, said system comprising:
 an electrically conductive coating composition applied in fluid form over an outer surface of the concrete, said coating composition when dry comprising a permeable binder material through which moisture permeates preventing entrapment of moisture in the reinforced concrete structure, and a predetermined amount of electrically conductive filler material selected from the group consisting of petroleum coke, metallurgical coke, calcined petroleum coke, fluid petroleum coke, acetylene black graphite, natural graphite and flake graphite, and uniformly distributed in said binder material whereby said coating composition has a predetermined value of resistivity, said coating composition protecting said reinforced concrete structure from corrosion when electrical energy flows through the coating composition; and,
 a source of DC electrical energy not greater than 30 mA per square foot being connected between the reinforcing steel and the electrically conductive coating composition such that the electrically conductive coating composition is anodic with respect to the reinforcing steel.

2. A system according to claim 1 wherein the outer surface of the structure is not pretreated prior to the application of said coating composition.

3. A system according to claim 2 wherein a decorative permeable coating is applied over said coating composition.

4. A system according to claim 1 wherein said coating composition is applied in a thickness between 5 and 50 mils.

5. A system according to claim 4 wherein anodic connecting means are installed on the surface of the concrete and coated with said conductive coating composition, said anodic connecting means being connected to the positive terminal of said source of DC electrical energy, the negative terminal of said source of DC electrical energy being connected to the reinforcing steel.

6. A system according to claim 1 wherein said conductive filler material comprises a mixture of elemental carbon filler and graphite filler.

7. A system according to claim 6 wherein said elemental carbon filler is selected from the group consisting of petroleum coke, metallurgical coke, calcined petroleum coke, and fluid petroleum coke.

8. A system according to claim 7 wherein said graphite filler is selected from the group consisting of acetylene black graphite, natural graphite, and flake graphite.

9. A system according to claim 1 wherein said coating composition includes a solvent which facilitates the application of said coating composition onto said reinforced concrete structure, said solvent evaporates as said coating composition dries.

10. A system according to claim 9 wherein said coating composition comprises the following approximate weight percents:

| | |
|---|---|
| elemental carbon filler | 30 to 60% |
| graphite filler | 11 to 23% |
| binder | 11 to 24% |
| solvent | 10 to 20% |

11. A system according to claim 10 wherein said coating composition further includes 1% to 2% by weight of a surfactant.

12. A system according to claim 1 wherein said permeable binder material is one of an acrylic latex and an acrylic emulsion.

13. A system according to claim 12 wherein said composition is a paint composition.

14. A system according to claim 6 having a resistivity of about 10 ohms per square per mil thickness.

* * * * *